Patented Mar. 17, 1942

2,276,618

UNITED STATES PATENT OFFICE 2,276,618

N-PHENYLALIPHATIC DIHYDROXYPHENYL-ALIPHATIC AMINES

Fritz Kulz, Frankfort-on-the-Main, Germany, assignor to the firm Tropon-Werke Dinklage & Co., Cologne-Mulheim, Germany No Drawing. Application August 9, 1939, Serial No. 289,313. In Germany August 16, 1938

6 Claims. (Cl. 260—520.8)

This invention relates to new aliphatic-aromatic amines of the general formula

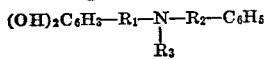

wherein $R_1$ and $R_2$ represent alkyl or alkylene radicles and $R_3$ represents hydrogen or an alkyl or alkylene radicle.

It is known that dihydroxyethylphenylamine, like adrenalin, causes vaso-constriction and thereby an increase of the blood pressure by stimulation of the sympathetic nerve terminations. Like adrenalin this compound and its derivatives, the ethyl or propyl substituted dihydroxyphenylethylamines, do not possess analgesic properties.

It has now been found that compounds which contain at the nitrogen, besides the dihydroxyphenylalkyl or the dihydroxyphenylalkylene radical, a phenylalkyl or phenylalkylene radicle and have the general formula

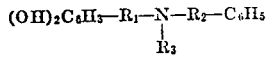

wherein $R_1$ and $R_2$ represent straight or branched alkyl or alkylene radicals and $R_3$ represents hydrogen or a straight or branched alkyl or alkylene radicle, possess analgesic properties if the following conditions are satisfied:

(1) In addition to the two hydroxyl groups in one benzene ring there must be no further hydroxyl groups in the benzene rings.

(2) The sum of the carbon atoms present in $R_1$ and $R_2$ must be at least 4. The positions of the two hydroxyl groups in the benzene rings are immaterial, as is also their position with regard to each other.

$R_1$ and $R_2$ may be alkyl radicals with straight chains such as methyl, ethyl, propyl, butyl, pentyl, hexyl or alkyl radicals with branched chains such as isobutyl, isopentyl or tertiary pentyl, or alkylene radicals with straight chains such as ethenyl, propenyl, butenyl, pentenyl, hexenyl, or alkylene radicals with branched chains such as isobutenyl or branched pentenyls or hexenyls. The carbon atoms present in $R_1$ and $R_2$ may be divided between $R_1$ and $R_2$ as desired. Their total number however must be at least four and should preferably not exceed ten. The analgesic properties of these new compounds are, as has been found, within these limits the greater, the greater is the total number of carbon atoms contained in $R_1$ and $R_2$.

$R_3$ may represent hydrogen or an alkyl or alkylene radical. Preferably $R_3$ does not contain more than four carbon atoms.

Besides the two hydroxyl groups in a benzene ring, the two benzene rings may contain other substituents, such as hydrocarbon residues, for example straight or branched alkyl or alkylene radicals or alkoxy or alkylene dioxy radicals, whereby the analgesic properties in relation to the other properties can be influenced to a manifold degree.

The production of the new compounds can be effected by introducing a phenylalkyl or phenylalkylene radical into a primary or secondary monophenylalkylamine or monophenylalkyleneamine, the benzene ring of one of these two components having present therein two hydroxyl groups.

Another way of producing these new compounds consists in converting the corresponding compounds in which at least one of the hydroxyl groups is esterified or etherified in known manner into compounds with free hydroxyl groups. The opening of the etherified or esterified hydroxyl groups can be effected in known manner, for example by heating the initial materials with dilute or concentrated mineral acids, such as hydrobromic acid or hydriodic acid or with aluminium halides, such as aluminium chloride or aluminium bromide or with phosphorus pentachloride or phosphorus pentabromide or in particular in the cases in which alkylene dihydroxy groups are present by heating with a mineral acid, such as hydrochloric acid or hydrobromic acid, in the presence of substances which react easily with formaldehyde, such as phloroglycine or resorcinol.

The production of these initial materials with etherified or esterified hydroxyl groups which are to be split off can be effected according to known methods for the production of secondary or tertiary amines, for example by condensing aldehydes or ketones with amines and hydrogenating the Schiff's bases formed or by heating an amine and an aldehyde according to the Leuckart-Wallach process in the presence of formic acid or other easily oxidisable substances or by reacting together monophenylalkylamines or monophenylalkyleneamines with a phenylalkyl halide or a phenylalkylene halide, two hydroxyl groups being contained in the benzene ring of one of the two components, of which at least one is etherified or esterified.

EXAMPLES

1. *Production of α-methyl-β-3.4-dihydroxy phenylethyl-methyl-benzylamine*

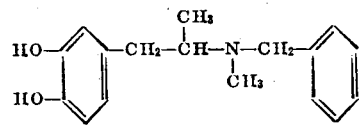

2.0 gms. of α-methyl-β-3.4-dimethoxy-phenylethyl - methyl - benzylamine, (B.pt. 16 mm. 220–225° C.) were boiled in a ten-fold quantity of hydriodic acid with the addition of a little red phosphorus until no more methyl iodide was evolved. The acid solution was filtered in carbon dioxide and the filtrate concentrated in CO₂ under reduced pressure. When the crystals began to separate the distillation was stopped. On cooling α-methyl-β-3.4-dihydroxyphenyl-ethyl-methyl-benzylamine hydriodide crystallised out.

2. *Production of α - methyl - β - 3.4 - dihydroxyphenyl-ethyl-4'-isopropyl-benzylamine*

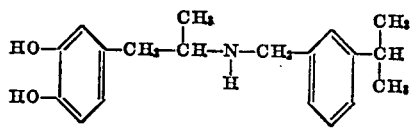

2.0 gms. of α-methyl-β-3.4-dimethoxy-phenyl-ethyl-4'-isopropyl-benzylamine hydrochloride of freezing point 156–158° C. (produced by the catalytic hydrogenation of the Schiff's base formed from methyl eugenylamine and cumin aldehyde) were boiled with 20 ccs. of colourless constant boiling hydriodic acid in a stream of carbon dioxide with the addition of a little red phosphorus until methyl iodide was no longer evolved. On cooling an oil separated out which was very slightly coloured and this was separated. From the aqueous layer there was separated by further evaporation in carbon dioxide under reduced pressure crystals of α-methyl-β-3.4-dihydroxy-phenylethyl-4'-isopropyl-benzylamine hydriodide separated out which were recrystallised from dilute hydriodic acid. The freezing point of the crystals after pressing on clay and drying over potash was 132° C. The oil layer was boiled in dilute hydriodic acid with animal charcoal. The crystals which separated after standing had the same properties as those obtained from the aqueous layer.

3. *Production of 3.4-dihydroxy-benzyl-ethyl-phenyl-propylamine*

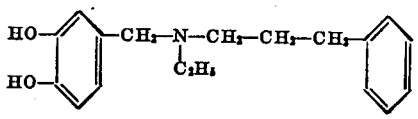

3.0 gms. of 3.4-dimethoxybenzyl-ethyl-phenyl-propylamine (produced from veratryl aldehyde and ethyl-phenyl-propylamine according to Leuckart-Wallach) of B.pt.₁₅ mm. 235–238° C. were boiled with 30 ccs. of constant boiling hydriodic acid in a stream of carbon dioxide until methyl iodide was no longer evolved. The freezing point of the 3.4-dihydroxy-benzyl-ethyl-phenyl-propylamine hydriodide obtained was 127° C.

4. *Production of 3.4-dihydroxybenzyl α-methyl-γ'phenyl-propylamine*

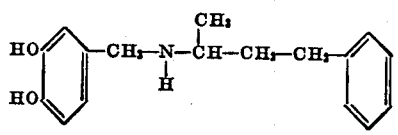

2.8 gms. of protocatechuic aldehyde and 3 gms. of α-methyl-γ'-phenyl-propylamine (about 1/50 gm. mol) were mixed. The solution became warm and cloudy. By warming on the water bath under reduced pressure and passing hydrogen therethrough the reaction was completed and water was driven off. Then the product was taken up in absolute alcohol and catalytically hydrogenated with the employment of palladium black. After taking up 480 ccs. of hydrogen the reaction came to an end. The solution was neutralised with hydrobromic acid and the greater part of the alcohol was driven out. From the residue the hydrobromide was carefully precipitated by the addition of ether. The precipitated salt which easily precipitates as an oil was crystallised from dilute hydrobromic acid. It was found after drying over potash in vacuum to have a freezing point of 155° C.

5. *Production of 1.2-dihydroxybenzyl-α-methyl-γ'-phenyl-propylamine*

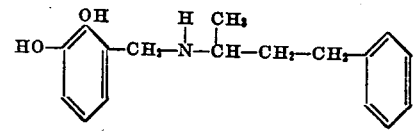

2.0 gms. of 1-hydroxy-2-methoxybenzyl-α-methyl-γ'-phenyl-propylamine (obtained by the catalytic hydrogenation of the Schiff's base obtained from ortho vanillin and α-methyl-γ'-phenyl-propylamine) were boiled with 20 ccs. of contant boiling hydrobromic acid for 2 hours in a stream of carbon dioxide. Working up was effected as in Example 1.

6. *Production of (α-methyl - β - 3.4 - dihydroxy-phenyl-ethyl) phenyl-ethylamine*

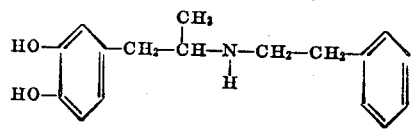

2.0 gms. of safryl-phenylethylamine hydrochloride of freezing point 197–198° C. (obtained from safrylamine and phenylethyl bromide) were heated with 20 ccs. of constant boiling colourless hydriodic acid in a stream of carbon dioxide with 0.3 gms. of resorcinol for 45 minutes. 20 ccs. of water where then added thereto. After treatment with animal charcoal and filtration α- methyl-β-3,4-dihydroxylphenyl - phenylethyl-amine hydriodide of freezing point 155° C. crystallised out.

7. *Production of (α-methyl - β - 3,4 - dihydroxyphenylethyl) - (γ-phenylpropyl) -ethylamine*

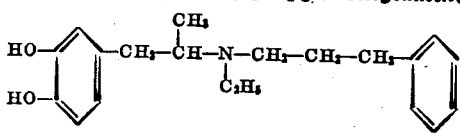

2.0 gms. of (α-methyl-β-3,4-dimethoxy-phenylethyl)-(γ'-phenylpropylethyl)amine hydrochloride of freezing point 133–115° C. were demethoxylated with hydriodic acid as in Example 1. The working up was effected in a similar manner as in Example 1 and the hydriodide obtained melted at 158° C.

8. *Production of α-methyl - β - 3,4 - dihydroxy-phenyl-ethyl-α'-methyl-γ'-phenylpropylamine*

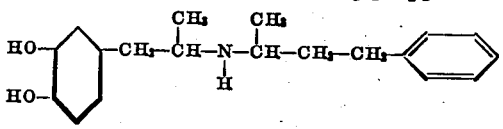

α-methyl-β-3,4-dimethoxy-phenylethyl-α'-methly - γ' - phenylpropylamine of B. pt.₂₋₃ ₘₘ. 188–190° C. was treated with hydriodic acid as in Example 1. By working up in a similar manner to that employed in Example 1 α-methyl-β-3,4-dihydroxy-phenylethyl-α'-methyl-γ'-phenyl-propylamine hydriodide was obtained of freezing point=163–164° C.

What I claim is:

1. An aliphatic aromatic amine of the formula

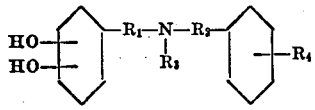

wherein $R_1$ and $R_2$ are hydrocarbon radicals selected from the group consisting of alkylene and unsaturated alkylene radicals, the total number of carbon atoms in such radicals being at least four, $R_3$ is selected from the group consisting of hydrogen and alkyl radicals, and $R_4$ is selected from the group consisting of hydrogen and alkyl radicals.

2. An aliphatic aromatic amine of the formula

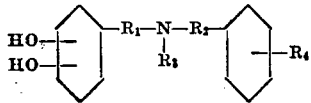

wherein $R_1$ and $R_2$ are hydrocarbon radicals selected from the group consisting of alkylene and unsaturated alkylene radicals, the total number of carbon atoms in such radicals being four to ten, $R_3$ is selected from the group consisting of hydrogen and alkyl radicals, and $R_4$ is selected from the group consisting of hydrogen and alkyl radicals.

3. An aliphatic aromatic amine of the formula

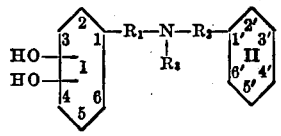

wherein $R_1$ and $R_2$ are hydrocarbon radicals selected from the group consisting of alkylene and unsaturated alkylene radicals, the total number of carbon atoms in such radicals being at least four, and $R_3$ is selected from the group consisting of hydrogen, and alkyl radicals.

4. The 3,4-dihydroxybenzyl-$\alpha'$-methyl-$\gamma'$-phenylproylamine of the formula

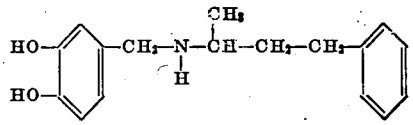

5. The ($\alpha$-methyl-$\beta$-3,4-dihydroxy-phenyl-ethyl)-($\gamma$-phenylpropyl)-ethylamine of the formula

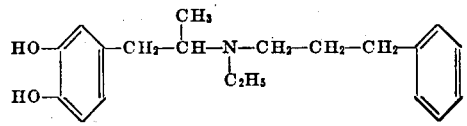

6. The $\alpha$-methyl-$\beta$-3,4-dihydroxy-phenyl-ethyl-$\alpha'$-methyl-$\gamma'$-phenylpropylamine.

FRITZ KULZ.